United States Patent
Ono et al.

(10) Patent No.: US 6,934,112 B2
(45) Date of Patent: Aug. 23, 2005

(54) METHOD FOR OBTAINING HEAD POSITIONS IN MAGNETIC DATA WRITING APPARATUS

(75) Inventors: Takuya Ono, Nagano (JP); Kiminori Sato, Nagano (JP)

(73) Assignee: Fuji Electric Device Technology Co. Ltd., Tokyo (JP)

(*) Notice: Subject to any disclaimer, the term of this patent is extended or adjusted under 35 U.S.C. 154(b) by 0 days.

(21) Appl. No.: 10/790,237

(22) Filed: Mar. 2, 2004

(65) Prior Publication Data

US 2004/0228025 A1 Nov. 18, 2004

(30) Foreign Application Priority Data

Mar. 4, 2003 (JP) ........................................ 2003-056927

(51) Int. Cl.[7] .............................................. G11B 21/10
(52) U.S. Cl. .................... 360/75; 360/77.05; 360/78.12
(58) Field of Search ........................ 360/75, 15, 77.02, 360/77.04, 77.05, 77.08, 78.12

(56) References Cited

U.S. PATENT DOCUMENTS

| | | | | |
|---|---|---|---|---|
| 5,477,401 | A | * | 12/1995 | Squires et al. ................. 360/75 |
| 6,590,732 | B2 | * | 7/2003 | Kitagawa et al. .............. 360/75 |
| 6,735,032 | B2 | * | 5/2004 | Dunn et al. ................ 360/78.12 |
| 6,809,893 | B2 | * | 10/2004 | Uzumaki et al. .............. 360/31 |
| 2003/0086196 | A1 | * | 5/2003 | Morris et al. .................. 360/75 |
| 2003/0099050 | A1 | * | 5/2003 | Kitagawa ...................... 360/75 |
| 2003/0123172 | A1 | * | 7/2003 | Zhu et al. ...................... 360/75 |
| 2005/0073762 | A1 | * | 4/2005 | Sato et al. ..................... 360/75 |

FOREIGN PATENT DOCUMENTS

| | | |
|---|---|---|
| JP | 03-214474 | 9/1991 |
| JP | 06-028793 | 2/1994 |
| JP | 06-044711 | 2/1994 |
| JP | 06-060545 | 3/1994 |
| JP | 10-172254 | 6/1998 |
| JP | 2001-216750 | 8/2001 |

* cited by examiner

*Primary Examiner*—David Hudspeth
*Assistant Examiner*—James L. Habermehl
(74) *Attorney, Agent, or Firm*—Rabin & Berdo, P.C.

(57) ABSTRACT

A method for obtaining relative positional relationships between a read-only head for reading data from an original disk and servo heads on each surface of magnetic disks (copy disks), in a magnetic data writing apparatus (disk servo writer) that stacks copy disks and an original disk to rotate the disks unitarily. The apparatus includes a rotary positioner on the periphery of the copy disks and a read-only disk, stacking the read-only head and servo heads rotatably. The apparatus causes the servo heads simultaneously to write servo data to respective assigned track ranges. The method includes stacking calibration disks storing servo data in place of the copy disks in a coaxial relation with the read-only head, in advance of writing magnetic data to the copy disks. Using the calibration disks, relative positional relationships are obtained as between the address that the read-only head reads out from the original disk and the addresses that servo heads read out from calibration disks at the same time that the read-only head reads out the address thereof.

4 Claims, 11 Drawing Sheets

METHOD FOR OBTAINING HEAD POSITIONS IN MAGNETIC DATA WRITING APPARATUS

BACKGROUND OF THE INVENTION

1. Field of the Invention

The invention relates to a magnetic data writing apparatus called a "disk servo writer", for writing servo patterns for detecting magnetic head positions, writing ID patterns for identifying disks, and writing programs into magnetic disks that initially contain no data, to produce magnetic disk products including data written therein upon requests of clients. Hereinafter, the magnetic data writing apparatus will be referred to as the "disk servo writer."

Specifically, the invention relates to a disk servo writer for stacking a plurality of magnetic disks (hereinafter referred to as "copy disks"), to which magnetic data is to be transferred, and a magnetic disk (hereinafter referred to as an "original disk") storing the magnetic data to be transferred to the copy disks and/or the magnetic data referred to in writing data to the copy disks. The disk servo writer rotates the copy disks and the original disk concentrically (around a common axis), and simultaneously writes onto the copy disks the magnetic data determined on the basis of the data read out from the original disk. The data to be written is read out via a magnetic head used solely for reading out data the respective copy disks via multiple sets of magnetic heads (hereinafter referred to as "servo heads"). Each set of magnetic heads includes a plurality of servo heads arranged on the recording surface of the respective copy disk.

More specifically, the invention relates to a method of obtaining head positions in a magnetic data writing apparatus (disk servo writer) for easily obtaining the relative position address relationships between the read-only head and the servo heads in advance, to cause the servo heads on the recording surface of a copy disk to write data correctly into the respective track ranges to which the servo heads are assigned.

2. Prior Art

Recently, recording densities of the hard disk drives have been increasing continuously to realize small magnetic storage devices with high storage capacities. To realize higher recording densities, the tracking servo technique for the magnetic heads for writing and reading data plays important roles.

According to the conventional tracking servo technique, tracking servo signals, address signals (track addresses, sector addresses), clock signals and such data signals, are formatted and recorded in the form of servo patterns in the magnetic recording media (magnetic disks). The magnetic head reads out these data signals, checks the position thereof based on the data signals read out, and corrects the position thereof to scan the tracks accurately.

One of the means for recording the servo patterns in the magnetic disks is a disk servo writer, which stacks a plurality of magnetic disks, employs one of the magnetic disks as an original disk, stores the servo data in the original disk in advance, and copies the servo patterns formed, from the servo data in the original disk to the other magnetic disks via magnetic heads.

Now a conventional disk servo writer will be described below with reference to FIGS. 9 through 11, wherein the same reference numerals are used to designate the same or corresponding constituent elements. FIG. 11 is a top plan view of a magnetic disk 4 schematically showing regions PS2 (hereinafter referred to as "servo pattern regions"), in which servo patterns are stored, and regions DTA (hereinafter referred to as "data regions"), in which data is stored. Servo pattern regions PS2 are arranged radially at every same number of degrees of angle, that is, at a sector interval. Servo pattern regions PS2 and data regions DTA are on both major surfaces of magnetic disk 4. In the following, the reference symbol PS2 is used also to designates servo patterns and the reference symbol DATA also to designate data.

Data regions DTA are the regions in which the foregoing ID patterns and programs are written by a disk servo writer at the requests of the client, or the regions in which data is written by the user of magnetic disk 4. FIG. 9 is a block diagram schematically showing a conventional disk servo writer. A disk servo writer of a similar kind is disclosed in Japanese Unexamined Laid Open Patent Application 2001-216750.

Figure 9A:
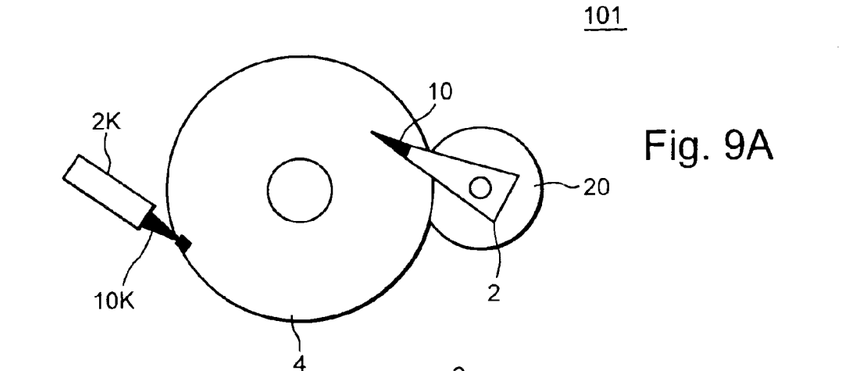
FIG. 9 is a block diagram schematically showing a conventional disk servo writer.
Figure 9B:
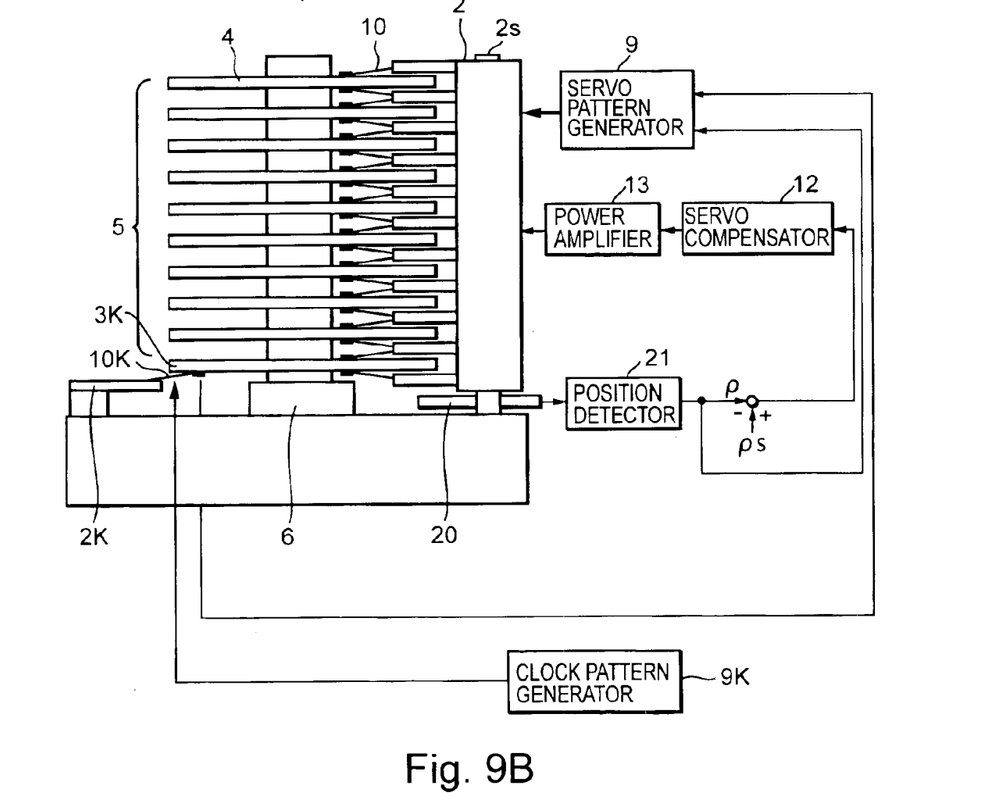

Referring now to FIG. 9, a disk servo writer 101 mounts a disk stack unit 5 stacking multiple (nine in the figure) magnetic disks (copy disks) 4, in which data is to be written, and a clock pattern disk 3K below disk stack unit 5. The disks are mounted on the shaft of a spindle motor so that disk stack unit 5 and clock pattern disk 3K may be rotated simultaneously at a high speed of rotation.

Figure 10:
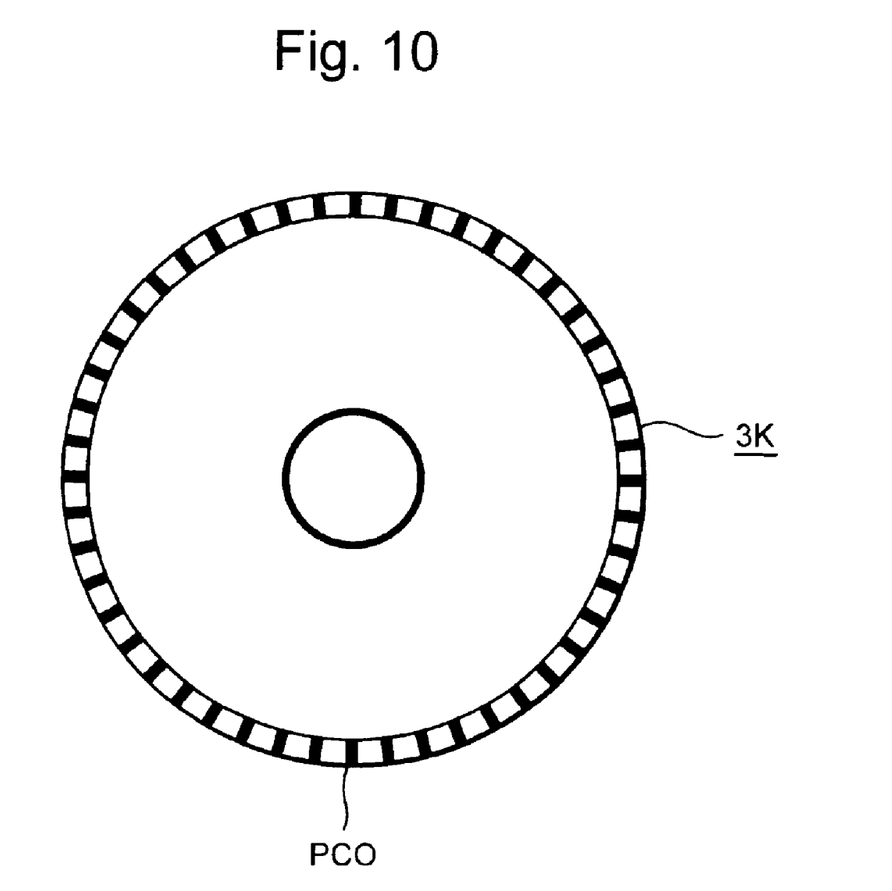
FIG. 10 is a top plan view of a clock pattern disk used in the disk servo writer of FIG. 9.
Figure 11:
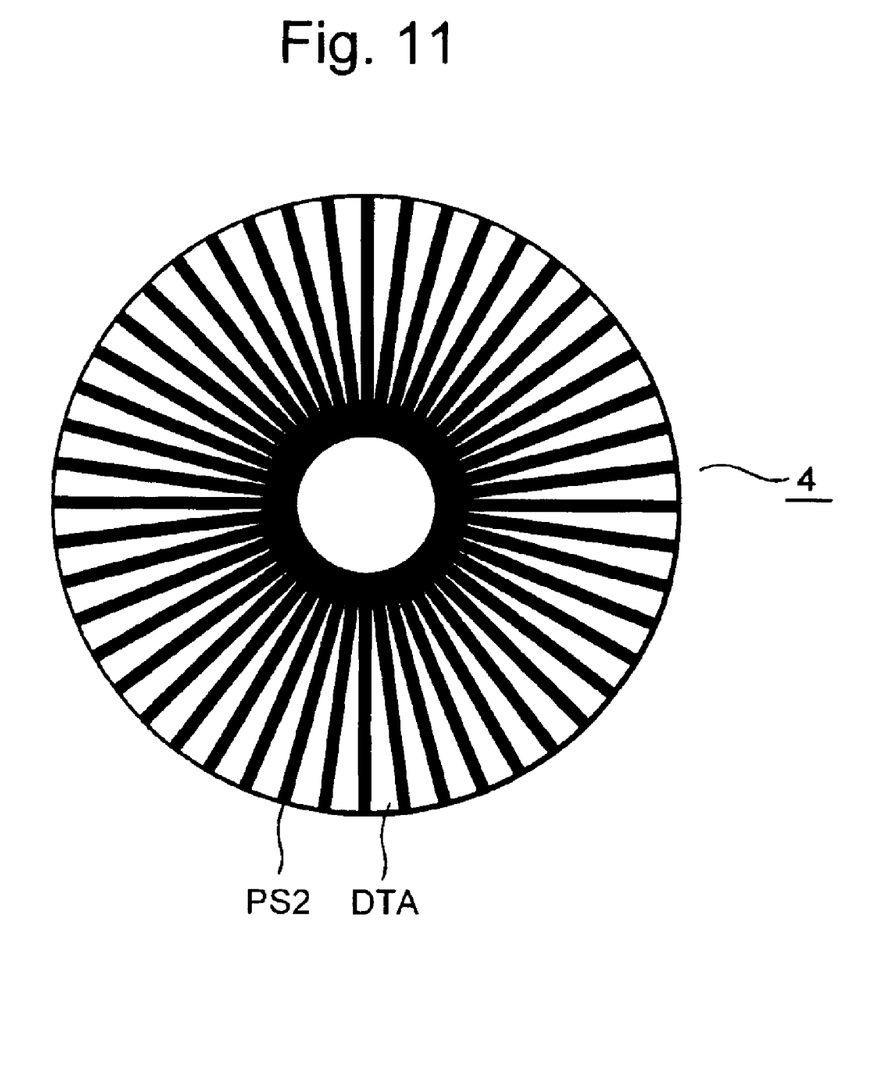
FIG. 11 is a top plan view of a magnetic disk.

Clock pattern disk 3K is obtained by writing clock patterns PCO in the outermost circumference section of a magnetic disk as shown in FIG. 10 with disk servo writer 101. The clock patterns PCO are written in advance of writing servo patterns PS2 to the other copy disks 4. Then, servo patterns PS2 are written into the copy disks 4, synchronizing with the clocks obtained by reading out clock patterns PCO.

Also shown in FIG. 9 is a clock head 10K for writing and reading clock patterns PCO directly to and from clock pattern disk 3K, a clock head positioner 2K for supporting clock head 10K and for positioning clock head 10K in the outermost circumference section of clock pattern disk 3K, and a clock pattern generator 9K for generating the signals of clock pattern PCO to be written into clock pattern disk 3K. Servo heads 10 are magnetic heads arranged in one-to-one correspondence to the respective surfaces of M copy disks 4, for writing servo patterns PS2 directly to the respective surfaces of copy disks 4. A rotary positioner 2 is provided for stacking the servo heads 10 and for rotating them around an axis 2s to move them to the desired radial positions on the respective copy disks 4. An encoder 20 is arranged in a coaxial manner with rotary positioner 2 for detecting the rotating position of rotary positioner 2. A position detector 21 obtains the positions (analog values) of servo heads 10 in the radial direction of the magnetic disk from the rotating position detected by encoder 20.

A servo compensator 12 and a power amplifier 13 constitute, together with encoder 20 and position detector 21, a feedback loop for controlling via rotary encoder 2 the positioning of servo heads 10 in the radial direction of the respective disks, that is the positioning of servo head 10 on the radial position in the center of the desired track.

The difference between the reference position $\rho_S$ of each servo head 10 (the analog value corresponding to the radius of the center of the target track) and the detected head position $\rho$, which is the actual radial position outputted from position detector 21, is inputted to servo compensator 12. Servo compensator 12 amplifies the inputted difference and calculates a servo compensation value that minimizes the difference. Power amplifier 13 outputs a current for driving rotary positioner 2 based on the servo compensation value to move the servo heads 10. A servo pattern generator 9, to which the clock is inputted from clock head 10K and the detected head position ρ is inputted from position detector 21, generates servo patterns PS2 and causes servo heads 10 stacked on rotary positioner 2 to write the servo patterns PS2 to the respective copy disks 4.

Now the entire functions of the conventional disk servo writer shown in FIG. 9 will be described. First, clock head 10K stores clock patterns PCO generated from clock pattern generator 9K at an arbitrary radial position (the outermost circumference section in FIG. 10) on clock pattern disk 3K.

Then, the actual radial position p of the servo heads 10 is detected by rotary encoder 20 arranged in a coaxial manner with rotary positioner 2 and position detector 21. The error (difference) between the detected head position ρ and the reference head position $\rho_S$ is fed back through servo compensator 12 and power amplifier 13, and servo head 10 is caused to track the reference head position $\rho_S$ via the rotary positioner 2.

In the tracking state, servo heads 10 simultaneously write the servo patterns PS2 generated by the servo pattern generator 9, to the surfaces of the respective copy disks 4, synchronizing with the clock read out from clock pattern disk 3K via clock head 10K. The servo pattern generator 9 is provided with means (not illustrated in the drawings) that outputs data such as ID data and programs to servo heads 10, synchronizing with the clock from clock pattern disk 3K and that causes the servo heads 10 to write the data and the programs to data regions DTA on the copy disks 4.

Other related prior art patent publications describe other known techniques related to writing onto magnetic disks. Thus, Japanese Unexamined Laid Open Patent Application H10 (1998)-172254 and Japanese Unexamined Laid Open Patent Application H03 (1991)-214474 disclose methods for writing servo data to magnetic disks, including the step of selecting a master surface from the recording surfaces of magnetic disks, the step of writing a master servo pattern onto the master surface in a hard disk drive, and the step of writing servo patterns onto the recording surfaces other than the master surface while positioning the magnetic heads based on the master servo pattern. Japanese Unexamined Laid Open Patent Application H06 (1994)-44711 discloses a method for simultaneously writing servo patterns on the recording surface of a magnetic disk with a plurality of magnetic heads in a disk servo writer. Japanese Unexamined Laid Open Patent Application H06 (1994)-60545 discloses the method for simultaneously writing servo data to a plurality of magnetic disks in a hard disk drive based on the signals from an external servo writer. Japanese Unexamined Laid Open Patent Application H06 (1994)-28793 discloses the method for compensating off-track in a hard disk drive.

As described above, the conventional disk servo writers write the servo patterns generated by a servo pattern generator simultaneously to stacked magnetic disks, sy with the clock patterns recorded in advance in a clock pattern disk. Therefore, the amount of time for writing the servo patterns to the entire surfaces of all the disks in a disk stack unit is given by (the time for on revolution of the disk)×(the number of tracks, to which the servo patterns are written).

As the track density on a magnetic disk is improved, the time for servo pattern writing becomes longer, causing lower throughput. Although it is possible to shorten the time for servo pattern writing by increasing the rotational speed of the disks, there is a tradeoff between shortening the writing time by faster disk rotation and mechanical vibrations that become more vigorous with the increased speed and make it harder to write the servo patterns accurately.

Of course, the throughput is improved by increasing the number of the magnetic disks stacked. However, the accuracy of the spindle motor rotation is impaired by increasing the number of disks in the stack since a heavier load is exerted on the spindle motor. Thus, it becomes increasingly difficult to mount the magnetic heads within the predetermined range of accuracy, as the number of stacked magnetic heads increases.

A method for avoiding these problems, and for shortening the servo pattern writing time has been proposed. The method includes stacking on the shaft of a spindle motor an original disk storing servo data as a base of servo patterns and a plurality of copy disks, arranging a plurality of servo heads on each surface of the copy disks, and causing the servo heads to write the servo patterns formed based on the servo data read out by a read-only head from the original disk to the respective track ranges assigned to the respective servo heads.

However, since the displacements between the read-only head on the original disk and a plurality of the servo heads on the surface of each copy disk are different from servo head to servo head, the servo patterns written in may be displaced. To prevent the servo pattern displacement from occurring, it is necessary to accurately detect the positional relationships between the read-only head and the servo heads in advance, and to correct the displacements prior to writing the servo patterns via the servo heads. However, it takes time to detect the positions of the magnetic heads. Therefore, it is necessary to obviate this problem.

OBJECTS AND SUMMARY OF THE INVENTION

In view of the foregoing, it would be desirable to provide a method of obtaining the head positions in a disk servo writer, which stacks an original disk and a plurality of copy disks and causes a plurality of servo heads arranged on each surface of the copy disks simultaneously to write the servo patterns obtained based on the servo data read out by a read-only head from the original disk to each surface of the copy disks, for easily obtaining the relative positional relationships between the read-only head on the original disk and the servo heads on the surfaces of the copy disks.

According to a first aspect of the invention, there is provided a method for obtaining magnetic head positions in a magnetic data writing apparatus (a disk servo writer) including a spindle motor having a shaft mounting thereon a plurality of first magnetic disks (copy disks to which magnetic data is to be transferred, and a second magnetic disk (an original disk) storing at least in one major surface thereof original disk data including the magnetic data to be transferred to the copy disks and/or the magnetic data consulted in writing magnetic data to the copy disks. The spindle motor rotates the copy disks and the original disk as a unit. A rotary positioner on the periphery of the copy and original disks, stacks rotatably multiple sets of first magnetic heads (servo heads) and a single set of second magnetic heads (read-only heads) for reading the original disk data from the original disk into a unit. One set of servo heads is provided for (assigned to) each surface of each copy disk. Each set of servo heads includes a predetermined number of servo heads for writing magnetic data to the copy disk surface to which it is assigned, to cause the servo heads simultaneously to write the magnetic data determined based on the original disk data read out by the read-only heads from the original disk. The magnetic data is written to the respective track ranges assigned thereto on the copy disk surfaces.

The method includes mounting third magnetic disks (calibration disks) on the shaft of the spindle motor in place of the copy disks, prior to writing magnetic data to the copy disks. The calibration disks store calibration data, which facilitates making the servo heads accurately read therefrom first addresses indicating the addresses of the tracks and sectors, where the servo heads are on the surfaces of the calibration disks.

The method also includes reading out second addresses with read-only heads from the original disk. The read out second addresses indicate the addresses of the tracks and sectors on the original disk where the read-only heads are at present. The first addresses from the calibration disks are read out simultaneously with reading out the second addresses from the original disk to obtain the relationships between the position addresses of the read-only heads and the position addresses of the servo heads.

According to a second aspect of the invention, there is provided a method for obtaining magnetic head positions in a disk servo writer including a spindle motor having a shaft mounting thereon a plurality of copy disks to which magnetic data is to be transferred, and an original disk storing at least in one major surface thereof original disk data including the magnetic data to be transferred to the copy disks and/or the magnetic data consulted in writing magnetic data to the copy disks. The spindle motor rotates the copy disks and the original disk as a unit. Each of a plurality of rotary positioners on the periphery of the copy and original disks stack rotatably servo heads, two for each copy disk in the stack of copy disks, and a read-only head for reading the original disk data from the original disk into a unit. The servo heads for each copy disk surface include a predetermined number of servo heads for writing magnetic data to the copy disk surface to which it is assigned, to cause the servo heads simultaneously to write the magnetic data determined based on the original disk data read out by the read-only heads from the original disk. The magnetic data is written to the respective track ranges assigned thereto on the copy disk surface.

The method includes mounting calibration disks on the shaft of the spindle motor in place of the copy disks, prior to writing magnetic data to the copy disks. The calibration disks store calibration data, which facilitates making the servo heads accurately read therefrom first addresses indicating the position addresses of the tracks and sectors where the servo heads are on the surfaces of the calibration disks.

The method also includes reading out second addresses with read-only heads from the original disk. The read out second addresses indicate the position addresses of the track and sector on the original disk where the read-only heads are at present. The first addresses from each of the calibration disks are read out simultaneously with reading out the second addresses from the original disk to obtain the relationships between the position addresses of the read-only heads and position addresses of the servo heads.

Advantageously, the method further includes comparing the first address, which each of the servo heads reads out while scanning the calibration disk surface including at least a track range assigned to the each of the servo heads, and the second address corresponding to the first address, to prepare an address lookup table indicating the relationships between the position addresses of the servo heads and the position address of the read-only head corresponding to the servo heads. The first address of each of the servo heads is obtained with reference to the address lookup table, the first address corresponding to the second address. The read-only head reads out the first address from the original disk to cause the each of the servo heads to write the magnetic data to be transferred in the position designated by the first address.

The method according to the invention for obtaining the positions of magnetic heads in a disk servo writer facilitates obtaining the relative positional relationships between a plurality of servo heads on the surface of a copy disk and a read-only head and causing the servo heads to write magnetic data to the respective track ranges on the copy disk, to which the servo heads are assigned. Therefore, the method according to the invention facilitates shortening the period of time for writing magnetic data to the copy disks.

DETAILED DESCRIPTION OF THE PREFERRED EMBODIMENTS

Now the invention will be described in detail hereinafter with reference to the accompanied drawing figures, which illustrate the preferred embodiments of the invention.

Figure 1A:
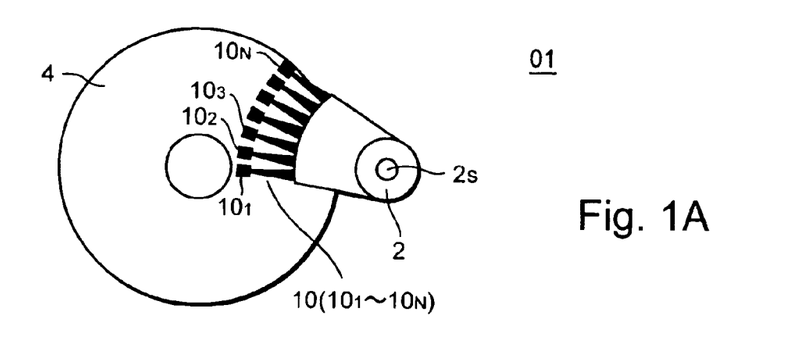
FIG. 1 is a partially block diagram, schematically showing the configuration in a disk servo writer, to which a method of obtaining the head positions therein according to a first embodiment of the invention is applied.
Figure 1B:
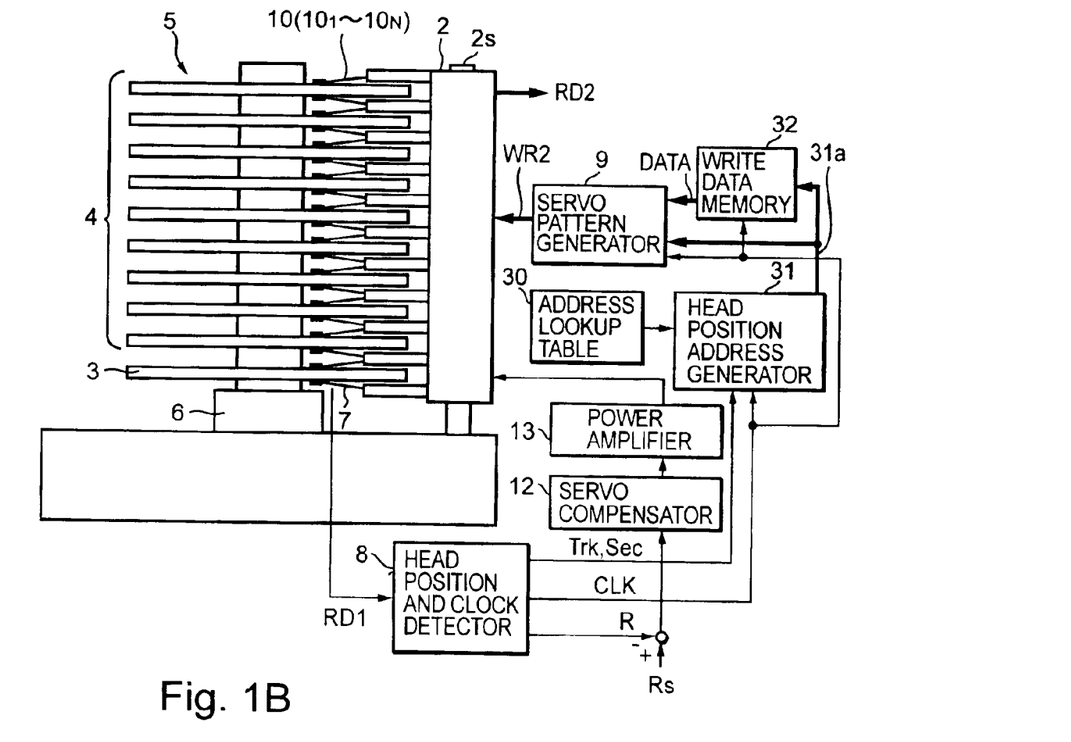

FIG. 1 is a block diagram schematically showing the configuration in a disk servo writer 01, to which a method according to a first embodiment of the invention is applied for obtaining the head positions therein.

In the disk servo writer 01, a disk stack unit 5 including a plurality (nine in FIG. 1) of stacked magnetic disks (copy disks) 4, to which the servo data is to be written, and an original disk 3 below disk stack unit 5 are mounted on the shaft of a spindle motor 6 rotating at several thousand rpm.

For each copy disk 4, N magnetic servo heads 10 ($10_1$ through $10_N$), are arranged radially like a fan on each copy disk surface. Hereinafter, servo heads $10_1$ through $10_N$ arranged radially like a fan on a disk surface will be referred to collectively as a "fan-shaped head $10_1$–$10_N$".

A rotary positioner 2 mounts rotatably on an axis $2_S$ a stack of fan-shaped heads $10_1$–$10_N$ at both of the opposite surfaces of each copy disk 4, and a read-only magnetic head (hereinafter referred to as a "read-only head") 7 at one of the surfaces (the lower surface in the figure) of original disk 3. Original disk 3 is a magnetic disk 4, to which the servo data described below is written in advance.

Figure 3:
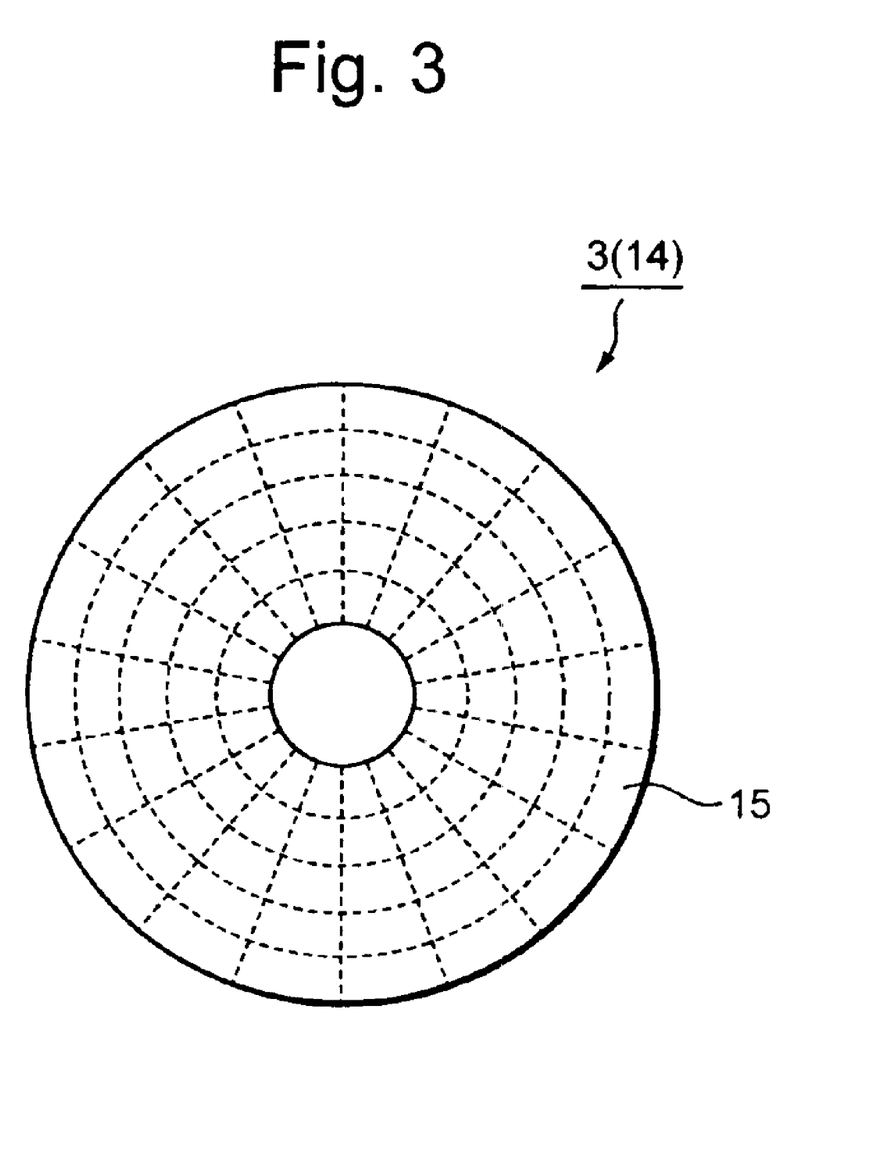
FIG. 3 is a top plan view of an original disk showing the configuration of the magnetic pattern written on the lower surface of the original disk.

FIG. 3 is a top plan view of original disk 3 showing a configuration of the magnetic patterns written on its lower surface. Original disk 3 is used also as a calibration disk 14 described later.

Circular tracks T are arranged concentrically on original disk 3 as shown in FIG. 3. Each track is divided into servo sectors 15 each of which spans a same specific angle. In contrast to a magnetic disk 4 used in the sector servo system for a hard disk drive, the surface of the original disk 3 does not have any data recording regions DTA.

The above-described servo sector arrangement facilitates improving the tracking accuracy of the read-only head 7 in tracking the designated track. In using original disk 3 as a calibration disk 14, the above-described servo sector arrangement facilitates detecting the accurate position of the servo head for reading data from the calibration disk 14.

Figure 4:
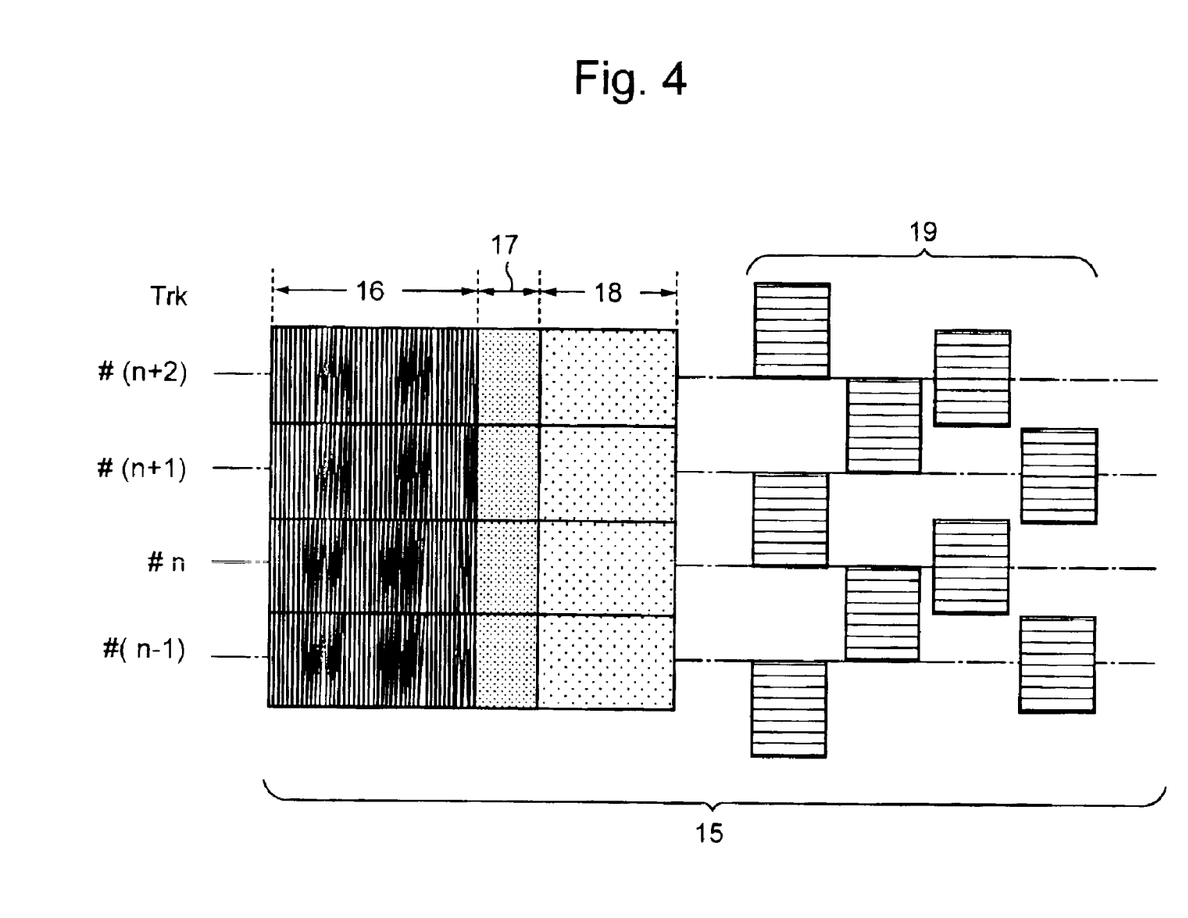
FIG. 4 shows the structure of the servo sector on the original disk.

FIG. 4 shows the structure of a servo sector 15 on original disk 3. In each servo sector 15, a clock signal region 16, a servo mark region 17, a servo region 18, and a burst signal region 19 are arranged in the stated order in the scanning direction of the magnetic heads.

Cyclic signals are stored in the clock signal region 16. A clock signal CLK, necessary for synchronizing the writing and reading data to and from disk 3, 14 or 4, is generated by reproducing the cyclic signals. The amplitude of the clock signal CLK is used for automatic gain control (AGC).

A certain bit pattern or dibit pulses are stored in servo mark region 17 to indicate the start of the servo region 18. In servo region 18, track data signals obtained by coding the track numbers (referred to also as the "track addresses" or the "track Nos.") Trk into gray codes and servo data signals indicating the sector numbers (referred to also as the "sector addresses" or the "sector Nos.") Sec are recorded.

In burst signal region 19, four columns of burst signals, offset by half the track width in the radial direction, are recorded and used for calculating the deviation of the magnetic head from the center of the track that the magnetic head is tracking and for detecting a precise radial position [Rr] (cf. FIG. 6) indicating the accurate distance of head 7 (or 10) from the disk center.

For obtaining an angular position [Θθ] (cf. FIG. 6) of head 7 (or 10) on disk 3 (or 14), a reference position for angle measurement is set, for example, at the starting point of servo mark region 17 in the sector No. 1 on disk 3 (or 14), to which magnetic head 7 (or 10) is assigned. The angular position [Θθ] of head 7 (or 10) on disk 3 (or 14) is obtained from the sector No. and the clock pulses, which magnetic head 7 (or 10) has counted from the starting point of servo mark region 17 in the sector.

Referring again to FIG. 1, the magnetic heads designated by the same reference numeral in fan-shaped heads $10_1$–$10_N$ on the surfaces of the respective copy disks 4, are adjusted to be accessible to the equidistant radial positions on the respective copy disks 4. Read-only head 7 is adjusted to be accessible to the radial position on original disk 3 equidistant to the radial position on a magnetic disk 4, to which any servo head in a fan-shaped head $10_1$–$10_N$, for example servo head $10_1$, is accessible.

A head position and clock detector 8 generates clock CLK from the signal of the clock signal region 16 in servo sector 15 in a read signal RD1 that read-only head 7 reads out from original disk 3. At the same time, head position and clock detector 8 detects R as the foregoing precise radial position [Rr] of read-only head 7 from the signal of the burst signal region 19 in servo sector 15. Still at the same time, head position and clock detector 8 detects the track No. Trk and the sector No. Sec as the position address of the head 7 from the signal of track and servo data region 18 in servo sector 15. Head position address generator 31 outputs the position addresses of servo heads $10_1$ through $10_N$ on copy disks 4 as position address signals 31*a* based on the position address (that is, the track No. Trk and the sector No. Sec) of read-only head 7 detected by head position and clock detector 8. In so doing, the head position address generator 31 consults an address lookup table 30 described later, and synchronizes with clock CLK.

A servo pattern generator 9 generates servo patterns PS2 corresponding to the position address of servo heads 10 on the surfaces of copy disks 4 based on position address signals 31*a* outputted from head position address generator 31 and synchronizing with clock CLK. The servo pattern generator 9 feeds servo patterns PS2 as write signals WR2 to the servo heads 10.

A servo compensator 12 obtains a servo compensation value that minimizes the error between the foregoing precise radial position R of read-only head 7 detected by head position and clock detector 8, and a reference head position $R_S$ fed from the outside. A power amplifier 13 outputs a current for driving rotary positioner 2 based on the servo compensation value.

The feedback loop feeds back the error between the precise radial position R of read-only head 7 and the reference head position $R_S$ to rotary positioner 2 through servo compensator 12 and power amplifier 13 so that the read-only head 7 tracks the reference head position $R_S$. During the tracking, position addresses are obtained for servo heads 10 on the surfaces of copy disks via the head position address generator 31, servo patterns PS2 corresponding to the position addresses are generated via servo pattern generator 9 synchronizing with clock CLK and fed to servo heads 10, and servo patterns PS2 are written in the respective copy disks 4 via the respective servo heads 10.

Since servo patterns PS2 are written to the surface of each copy disk 4 by the N servo heads $10_1$ through $10_N$ of the respective fan-shaped head $10_1$–$10_N$, which access the surface of the copy disk 4, the servo write time is shortened to 1/N of the conventional servo write time. If data to be written into data region DTA of copy disks 4 exists, the data is stored in a write data memory 32 shown in FIG. 1. In response to position address signals 31*a* inputted from head position address generator 31, write data memory 32 outputs data Data corresponding to the position addresses of servo heads $10_1$ through $10_N$ for the surface of the copy disk 4 to the servo pattern generator 9, synchronizing with clock CLK. Subsequently to writing servo patterns PS2, servo head 10 writes data Data in the data region DTA having the same position address.

Figure 2:
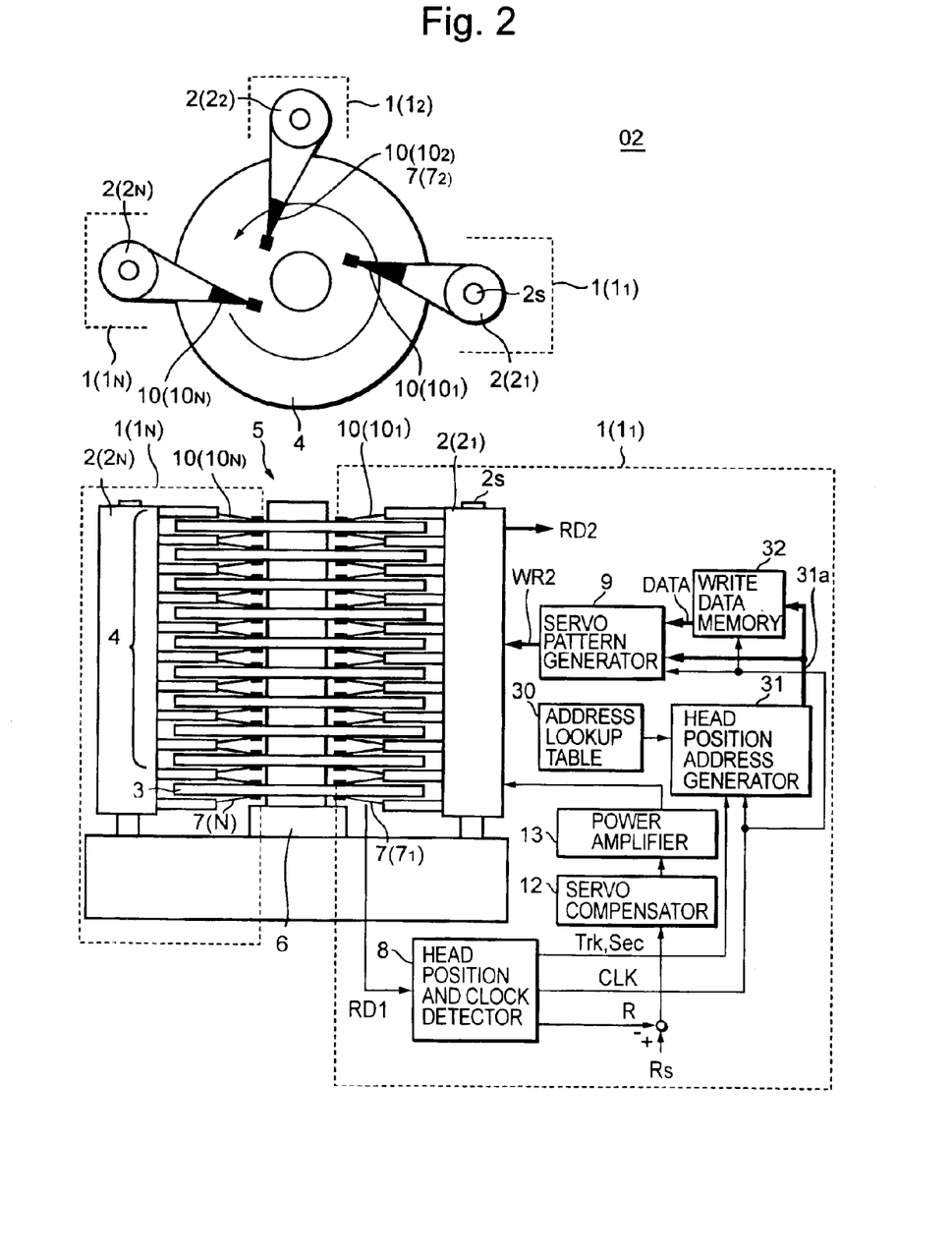
FIG. 2 is a partially block diagram, schematically showing the configuration in a disk servo writer, to which a method of obtaining the head positions therein according to a second embodiment of the invention is applied.

FIG. 2 is a block diagram schematically showing the configuration of a disk servo writer 02, to which a method according to a second embodiment of the invention is applied for obtaining the head positions therein. Disk servo writer 02 according to the second embodiment is different from disk servo writer 01 according to the first embodiment in that N sets (3 sets in FIG. 2) of rotary positioners 2 ($2_1$, $2_2$, ..., $2^N$) are arranged on the periphery of copy disks 4. Each rotary positioner 2 ($2_1$, $2_2$, ..., or $2_N$) stacks individual servo heads 10 for the respective surfaces of the copy disks 4 (one servo head 10 for each disk surface) and mounts the stack of servo heads 10 and a read-only head 7 rotatably on an axis $2_s$. That is, the servo heads for each copy disk surface are on individual rotary positioners, rather than on one rotary positioner as part of a fan-shaped head as in the embodiment of FIG. 1.

In FIG. 2, rotary positioner $2_1$ is shown as being representative all the rotary positioners $2_1$ through $2_N$. Although not shown in FIG. 2, the other rotary positioners $2_2$ through $2_N$ are provided with the respective circuits having the same configuration with that of the circuit for the rotary positioner 2 in FIG. 1. Each rotary positioner 2 ($2_1$, $2_2$, ..., or $2_N$) and the circuit thereof constitute a head stack servo unit 1 ($1_1$, $1_2$, ..., or $1_N$). Therefore, disk servo writer 02 in FIG. 2 includes N head stack servo units 1 ($1_1$, $1_2$, ..., $1_N$). In FIG. 2, the servo head on a rotary positioner 2 ($2_1$, $2_2$, ..., or $2_N$) is designated by the reference numeral 10 ($10_1$, $10_2$, ..., or $10_N$), and the read-only head for rotary positioner 2 ($2_1$, $2_2$, ..., or $2_N$) is designated by the reference numeral 7 ($7_1$, $7_2$, ..., or $7_N$) for the sake of making a clear distinction between them.

Servo heads $10_1$ are adjusted to access the radial positions on the respective copy disks 4 equivalent to the radial position on the original disk 3 that the read-only head $7_1$ accesses. Similarly, servo heads $10_2$ are adjusted to access the radial positions on the respective copy disks 4 equivalent to the radial position on the original disk 3 that the read-only head $7_2$ access. Finally, servo heads $10_N$ are adjusted to access the radial positions on the respective copy disks 4 equivalent to the radial position on original disk 3 that the read-only head $7_N$ accesses. Since the N separate servo heads $10_1$ through $10_N$ simultaneously write data into the respective track ranges on the surface of the copy disk 4 assigned thereto, the servo writing time is shortened to 1/N of the conventional servo writing time.

For causing fan-shaped head $10_1$–$10_N$ on the surface of copy disk 4 in FIG. 1 and servo heads $10_1$ through $10_N$ on the surface of copy disk 4 in FIG. 2 to write servo patterns accurately into the respective track ranges, while keeping an accurate track spacing of 1 μm or narrower therebetween, it is necessary to know with accuracy the position address of each servo head 10 on copy disk 4 corresponding to the position address on original disk 3 of read-only head 7 in rotary positioner 2. For facilitating this, it is necessary to know in advance the relative positional relationships, including mounting errors, between read-only head 7 and servo heads 10 on rotary positioner 2.

According to the invention, the relative positional relationship between read-only head 7 and every servo head 10 is found (calibrated) using calibration disks 14 stacked in disk stack unit 5 in place of copy disks 4. In the calibration, various kinds of calibration processing are performed by a calibrating means (not shown), to which read signals RD2 read out from calibration disks 14 via servo heads 10 and read signals RD1 read out from original disk 3 via read-only head 7 (or the position data of read-only head 7 obtained from head position and clock detector 8) are inputted. As described earlier, magnetic disks 4 storing the magnetic data (as with the magnetic data on the original disk 3, described earlier with reference to FIGS. 3 and 4) on both major surfaces thereof, are used for calibration disks 14.

Figure 5A:
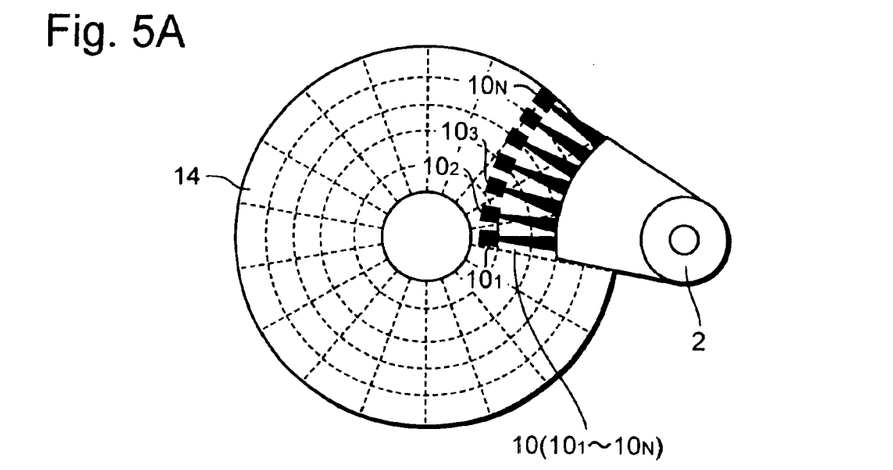
FIG. 5 is a diagram schematically showing the configuration in the disk servo writer mounting calibration disks in place of the copy disks, for describing a calibration method according to a first embodiment of the invention.
Figure 5B:
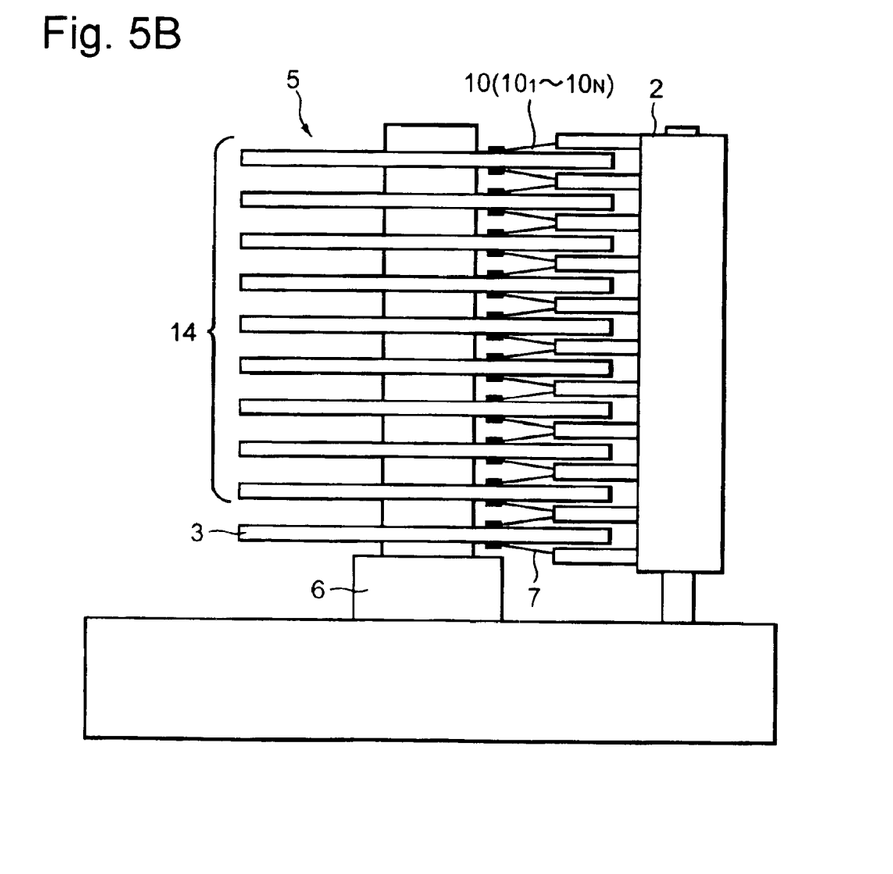

Now the calibration according to a first embodiment of the invention will be described in connection with disk servo writer 01 of FIG. 1, with reference to FIGS. 1, 5 and 6. FIG. 5 is a block diagram schematically showing the configuration of the disk servo writer 01 mounting calibration disks 14 in place of copy disks 4, for describing the calibration method according to the first embodiment. The precise radial positions [Rr] and the angular positions [Θθ] of servo heads $10_1$ through $10_N$ are obtained from the signals obtained from the foregoing servo sectors 15 in read signals RD2 from servo heads 10 ($10_1$ through $10_N$) on calibration disks 14.

Now the method for determining the relationships between the position coordinates of servo heads $10_1$ through $10_N$ on calibration disks 14, and the position coordinates of read-only head 7 on original disk 3, will be described below in connection with representative servo heads $10_1$ through $10_N$ (fan-shaped head $10_1$–$10_N$) on one surface of the calibration disk 14. The description is provided with reference to FIG. 6. FIG. 6 is a schematic for explaining the principle of the functions $f_1$ through $f_N$ (designated generally by $f_i$) described later, and relating the position of read-only head 7 on original disk 3 and the positions of servo heads $10_1$ through $10_N$ (designated generally by $10_i$) on a surface of the calibration disk 14.

Figure 6:
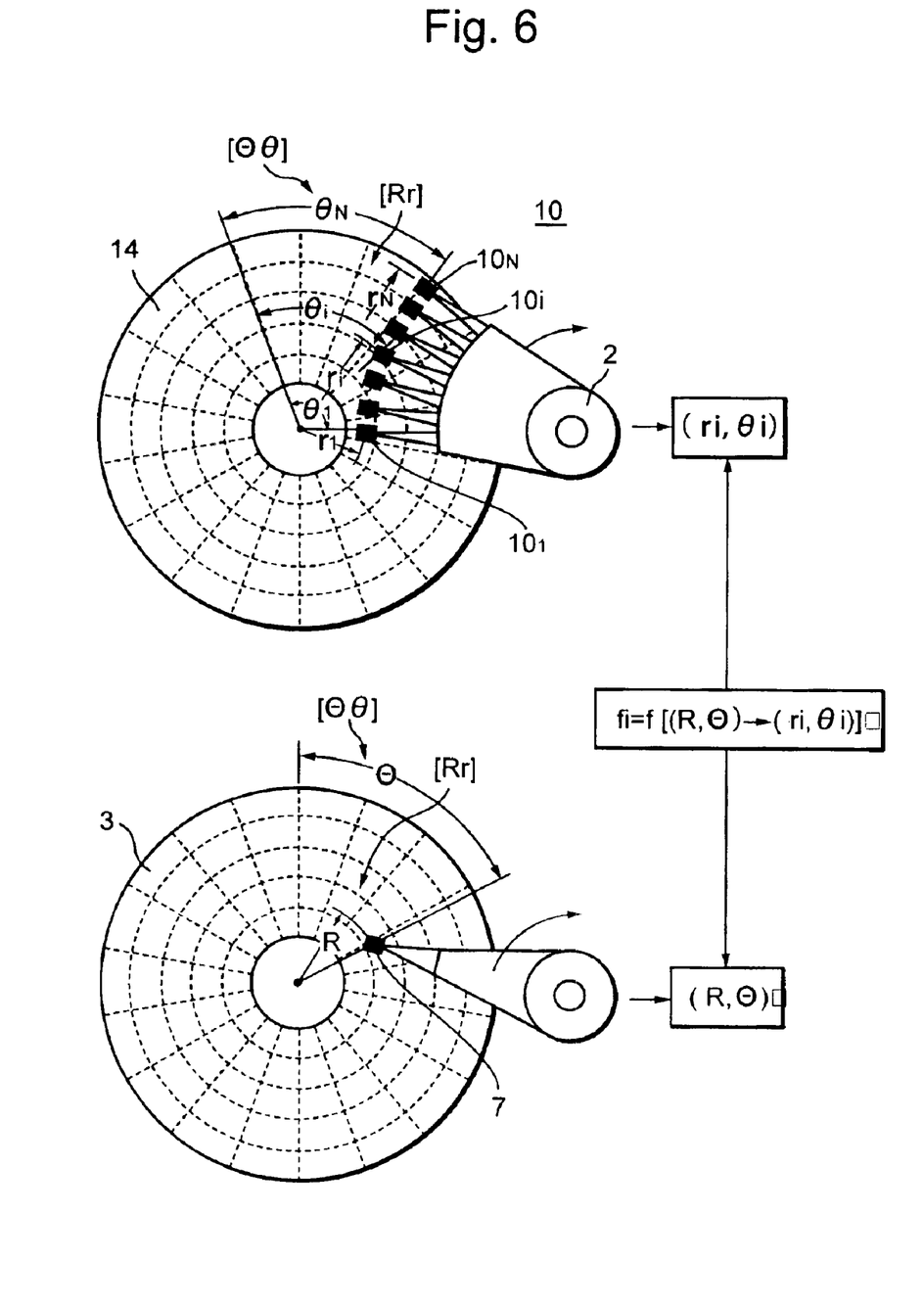
FIG. 6 is a schematic for explaining the principle of functions relating the position of the read-only head on the original disk and the positions of the servo heads on the surface of a calibration disk.

Referring now to FIG. 6, rotary positioner 2 is rotated to scan calibration disk 14 with the servo head $10_1$, from the inner circumference to the outer circumference thereof, and to cause servo head $10_1$ to read the calibration disk 14 for obtaining polar position coordinates ($r_1$, $θ_1$) consisting of a distance $r_1$ as the precise radial position [Rr] and an angle $θ_1$ as the angular position [Θθ]. At the same time, read-only head 7 is caused to read original disk 3 for obtaining polar position coordinates (R, Θ) consisting of a distance R as the precise radial position [Rr] and an angle Θ as the angular position [Θθ]. Then, the data indicating the relationship between the polar position coordinates ($r_1$, $θ_1$) and (R, Θ) (hereinafter referred to as a function "$f_1$=f[(R, Θ)→($r_1$, $θ_1$)]") is obtained and stored in the address lookup table 30 shown in FIG. 1.

By repeating the same operations for servo heads $10_2$ through $10_N$ one by one, the data of the corresponding functions $f_2$, $f_3$, ..., $f_N$ are stored in the address lookup table 30. Generally described, the function $f_i$ for a servo head $10_i$ is expressed as $f_i$=f[(R, Θ)→($r_i$, $θ_i$)]. Functions $f_1$ through $f_N$ are obtained for all the servo heads $10_1$ through $10_N$ on all the surfaces of the copy disks 4, and the data thereof is stored in address lookup table 30.

The functions $f_i$ through $f_N$ stored in address lookup table 30 are the data for obtaining the polar position coordinates ($r_i$, $θ_i$) (that is, the position addresses) fed to servo heads $10_1$ through $10_N$ (designated generally by $10_i$) on copy disks 4 from the polar position coordinates (R, Θ) (that is, the position address) of read-only head 7 on original disk 3 in writing servo patterns to the copy disks 4 as described later. Therefore, the relationships between the polar position coordinates (R, Θ) on original disk 3 and the polar position coordinates ($r_i$, $θ_i$) on calibration disks 14 are important.

In obtaining the relative positional relationships in practice, the position coordinates ($r_i$, $θ_i$), which the servo head $10_i$ reads from calibration disk 14 at the instant that the read-only head 7 reads the position coordinates (R, Θ=0), are stored in address lookup table 30. Every time the precise radial position R (in other words, the track address) of read-only head 7 is changed while maintaining the condition (Θ=0), the position coordinates $(r_i, θ_i)$ obtained are stored in the address lookup table 30.

Since the reference position for measuring $θ_i$ may be set at an arbitrary position, an angular position obtained by adding or subtracting a certain value to or from the angular positions $θ_i$ that the servo head $10_i$ has read out, may be stored as an angular positions $θ_i$ in the address lookup table 30 without any problem. In writing the servo patterns to copy disks 4, the position coordinates $(r_i, θ_i)$ to be fed to servo heads $10_i$ on copy disks 4 corresponding to the present position coordinates (R, Θ) of read-only head 7 on the original disk 3 are obtained in the following manner from address lookup table 30. First, the position coordinates $(r_i, θ_i)$ corresponding to the position coordinates (R, Θ=0) are obtained from address lookup table 30. Then, the radial position $r_i$, as obtained from the address lookup table 30, is used without conversion. The angular position $θ_i$ used for writing the servo pattern is obtained by adding the present angular position Θ of the read-only head 7 on original disk 3 to the value $θ_i$ obtained from address lookup table 30.

In practically writing the servo patterns to copy disks 4 in the disk servo writer 01 of FIG. 1, the position address (track No. Trk, sector No. Sec) corresponding to the position coordinates (R, Θ) of read-only head 7 is fed from the head position and clock detector 8 to the head position address generator 31 as soon as the read-only head 7 on the original disk 3 reaches the position coordinates (R, Θ). Head position address generator 31 obtains the position coordinates $(r_i, θ_i)$ for every servo head $10_i$ corresponding to the position coordinates (R, Θ), using the data of the function $f_i$ stored in address lookup table 30 as described above. Head position address generator 31 feeds the position addresses corresponding to the obtained position coordinates $(r_i, θ_i)$ to servo pattern generator 9 to cause servo heads $10_i$ to write the respective servo patterns.

Thus, it is possible to know the position addresses of servo heads $10_1$ through $10_N$ and to cause servo heads $10_1$ through $10_N$ to write magnetic data simultaneously. It also is possible to prevent servo heads $10_1$ through $10_N$ on one surface of copy disk 4 from writing magnetic data erroneously outside the assigned track ranges. That is, the head position address generator 31 incorporates a means for preventing position address signal 31a as the position address for every servo head $10_i$ from being outputted when the position address is outside the track range assigned to servo head $10_i$.

Figure 7A:
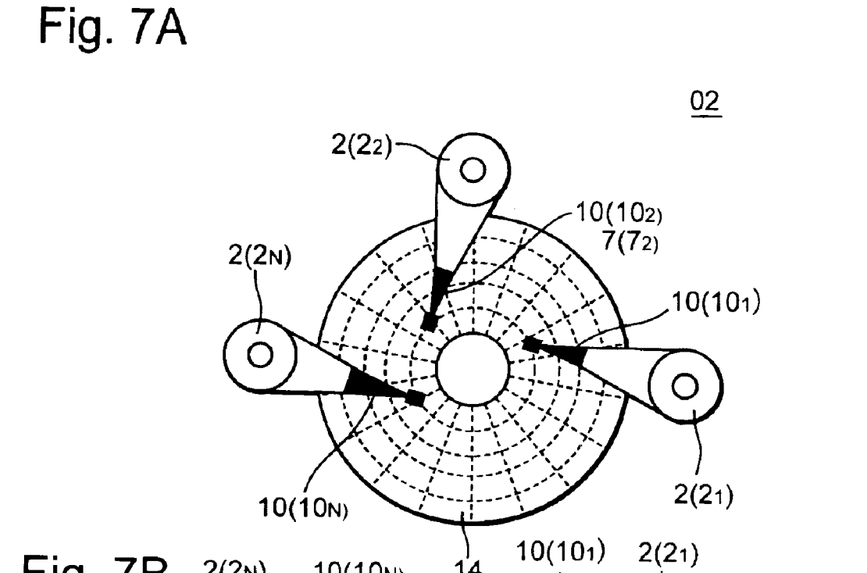
FIG. 7 is a partially block diagram, schematically showing the configuration in the disk servo writer mounting calibration disks in place of the copy disks for describing a calibration method according to a second embodiment of the invention.
Figure 7B:
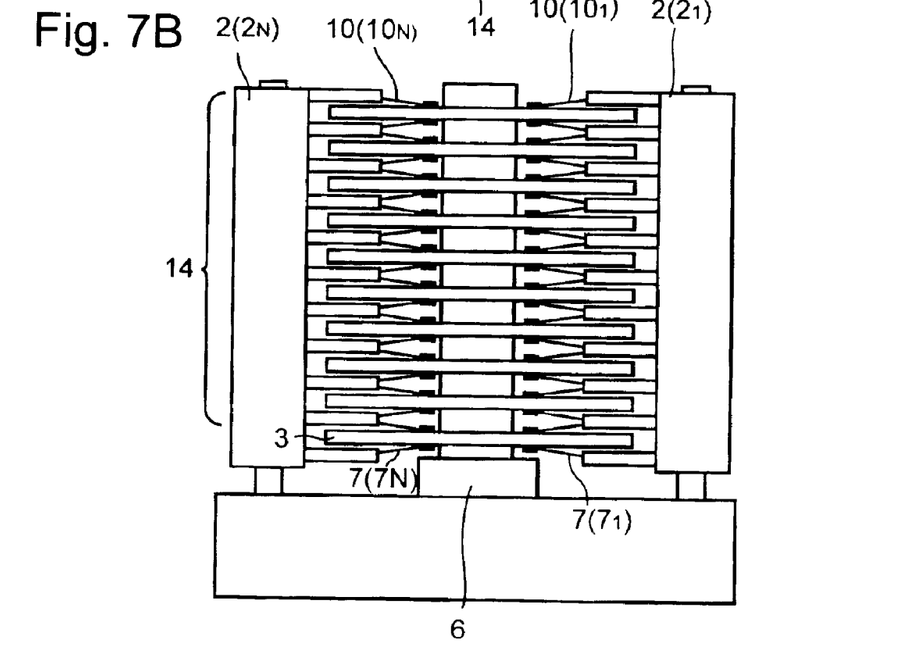
Figure 8:
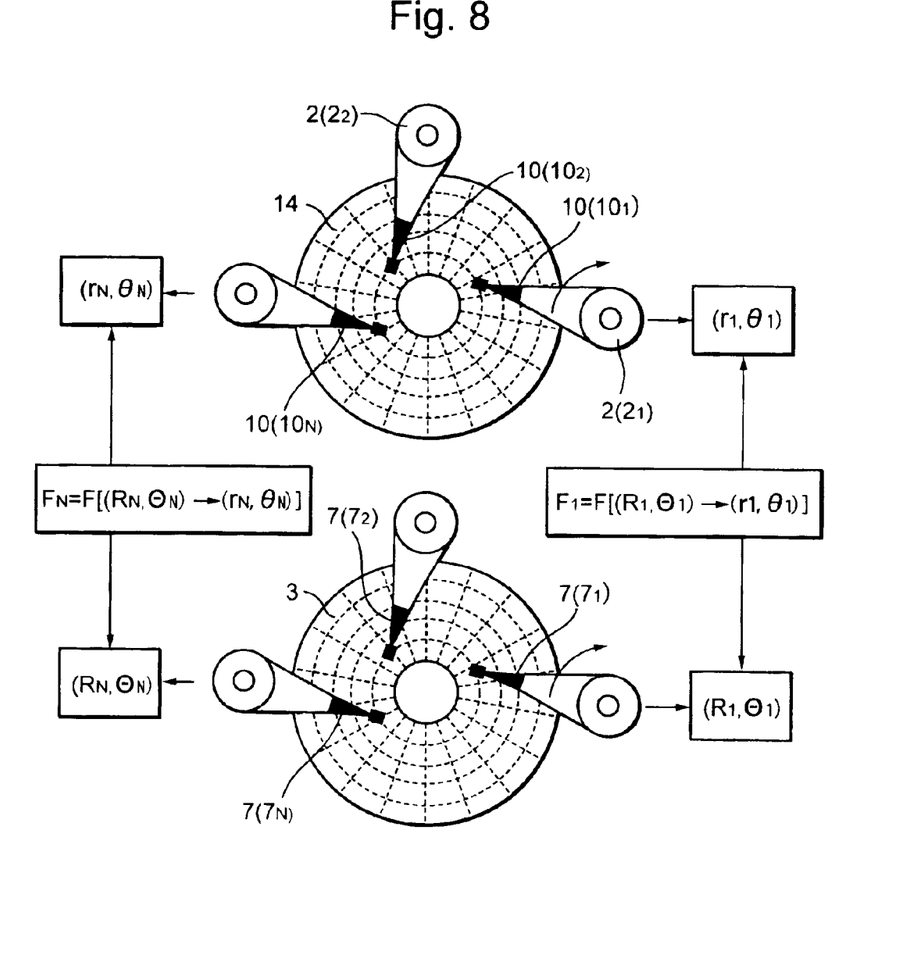
FIG. 8 is a schematic for explaining the principle of the functions relating the positions of the read-only heads on the original disk and the positions on the surface of a calibration disk of the servo heads on the respective head stack servo units.

Now the calibration according to a second embodiment of the invention will be described below in connection with disk servo writer 02 of FIG. 2, with reference to FIGS. 2, 7 and 8. FIG. 7 is a block diagram schematically showing the configuration in disk servo writer 02 in which the calibration disks 14 are mounted in place of copy disks 4, for illustrating the calibration method according to the second embodiment. FIG. 8 is a schematic for explaining the principle of the functions $F_1$ through $F_N$ (designated generally by $F_i$) relating the positions of read-only heads $7_1$ through $7_N$ (designated generally by $7_i$) on original disk 3, and the positions of servo heads $10_1$ through $10_N$ (designated generally by $10_i$) on a surface of a calibration disk 14.

As shown in FIG. 8 for one of the calibration disks, rotary positioners 2 $(2_1, 2_2, \ldots, 2_N)$ position read-only heads 7 $(7_1, 7_2, \ldots, 7_N)$ on the same precise radial position on original disk 3. In a similar manner as for the first embodiment, the data indicating the relative positional relationships (represented by the functions $F_i$=F[$(R_i, Θ_i)$→$(r_i, θ_i)$]) between the position coordinates $(r_1, θ_1), (r_2, θ_2), \ldots, (r_N, θ_N)$ (designated generally by $(r_i, θ_i)$), which servo heads 10 $(10_1, 10_2, \ldots, 10_N)$ obtain from calibration disk 14, and the position coordinates $(R_1, Θ_1), (R_2, Θ_2), \ldots, (R_N, Θ_N)$ (designated generally by $(R_i, Θ_i)$), which read-only heads 7 $(7_1, 7_2, \ldots, 7_N)$ obtain from original disk 3, is obtained.

Rotary positioners 2 $(2_1, 2_2, \ldots, 2_N)$ are rotated to cause heads $7_1, 7_2, \ldots, 7_N, 10_1, 10_2, \ldots, 10_N$ to scan disks 3 and 14 from the inner circumferences to the outer circumferences thereof and to obtain the functions $F_1, F_2, \ldots, F_N$. The data of the function $F_1$ is stored in the address lookup table 30 in head stack servo unit $1_1$, the data of the function $F_2$ is stored in the address lookup table 30 in head stack servo unit $1_2$, and so on. The data of the function $F_N$ is stored in the address lookup table 30 (not shown in FIG. 8) in head stack servo unit $1_N$. Generally described, the data of the function $F_i$ is stored in address lookup table 30 in the head stack servo unit $1_i$.

Acquisition of the data to be stored in address lookup table 30 and utilization of the stored data in the calibration according to the second embodiment are performed in the same manner as the data acquisition and utilization according to the first embodiment. That is, these are performed simply by using the function $f_i$=f[(R, Θ)→$(r_i, θ_i)$] according to the first embodiment for every rotary positioner $2_i$ according to the second embodiment, and by replacing $f_i$ with $F_i$ and (R, Θ) with $(R_i, Θ_i)$.

Practical servo pattern writing to copy disks 4 in disk servo writer 02 in FIG. 2 will be described below, by way of example, in connection with the head stack servo unit 1i. The position address (track No. Trk, sector No. Sec) corresponding to the position coordinates $(R_i, Θ_i)$ of read-only head $7_i$ on rotary positioner $2_i$ is fed from head position and clock detector 8 in head stack servo unit $1_i$ to head position address generator 31 in servo unit $1_i$ as soon as the read-only head $7_i$ on original disk 3 reaches the position coordinates $(R_i, Θ_i)$. Head position address generator 31 in the head stack servo unit $1_i$ obtains the position coordinates $(r_i, θ_i)$ for every servo head $10_i$ on rotary positioner $2_i$ corresponding to the position coordinates $(R_i, Θ_i)$, using the data of the function $F_i$ stored in address lookup table 30 in the head stack servo unit $1_i$. Head position address generator 31 feeds the position addresses of all the servo heads $10_i$ to the servo pattern generator 9 as position address signals 31a.

By performing the operations described above for all the head stack servo units $1_1$ through $1_N$, it becomes possible to position servo heads $10_1$ through $10_N$ in the respective track ranges and to cause servo heads $10_1$ through $10_N$ to write servo patterns simultaneously to the assigned track ranges. For preventing the servo heads $10_1$ through $10_N$ on one surface of a copy disk 4 from writing magnetic data erroneously outside the respective track ranges assigned, the head position address generator 31 in every head stack servo unit $1_i$ incorporates a means for preventing position address signal 31a, as the position address for every servo head $10_i$ on rotary positioner $2_i$, from being outputted when the position address is outside the track range assigned to servo head $10_i$.

The method according to the invention for obtaining the positions of magnetic heads in a disk servo writer facilitates obtaining the relative positional relationships between a plurality of servo heads on the surface of a copy disk and a read-only head and making the servo heads write magnetic data to the respective track ranges on the copy disk to which the servo heads are assigned. Therefore, the method according to the invention facilitates shortening the period of time for writing magnetic data to the copy disks and reducing the manufacturing costs of the copy disks.

This application corresponds to applicants' Japanese Patent Application Ser. No. 03-056927, filed Mar. 4, 2003, the entire disclosure of which is incorporated herein by reference.

What is claimed:

1. A method for obtaining magnetic head positions in a magnetic data writing apparatus including (1) a spindle motor having a shaft mounting thereon a plurality of first magnetic disks, to which magnetic data is to be transferred, and a second magnetic disk storing at least in one major surface thereof original disk data including at least one of the magnetic data to be transferred to the first magnetic disks and magnetic data consulted in writing magnetic data to the first magnetic disks, the spindle motor rotating the first magnetic disks and the second magnetic disk as a unit, and (2) a rotary positioner on the periphery of the first and second magnetic disks, the rotary positioner stacking rotatably multiple sets of first magnetic heads, and a set of second magnetic heads for reading the original disk data from the second magnetic disk into a unit, the multiple sets of first magnetic heads including one set assigned to each disk surface of each first magnetic disk, each set of first magnetic heads including a predetermined number of the first magnetic heads for writing magnetic data to the disk surface to which the set is assigned, thereby to cause the first magnetic heads simultaneously to write the magnetic data determined based on the original disk data read out by the second magnetic heads from the second magnetic disk, to respective track ranges assigned thereto on the disk surfaces, the method comprising the steps of:

mounting third magnetic disks on the shaft of the spindle motor in place of the first magnetic disks prior to writing magnetic data to the first magnetic disks, the third magnetic disks storing calibration data on the surfaces thereof for facilitating accurate reading by the first magnetic heads of first addresses indicating the position addresses of the tracks and sectors at which the first magnetic heads are present; and reading out second addresses included in the original disk data, by the second magnetic heads from the second magnetic disk, the second addresses indicating the position addresses of the tracks and sectors on the second magnetic disk where the second magnetic heads are present, and reading out the first addresses from the third magnetic disks simultaneously with reading out the second addresses, thereby to obtain relationships between the position address of each second magnetic head and corresponding position addresses of the first magnetic heads.

2. The method according to claim 1, the method further comprising:

comparing the first address, which each of the first magnetic heads reads out while scanning the corresponding third disk surface including at least a track range assigned to the each of the first magnetic heads, and the second address corresponding to the first address, thereby to prepare an address lookup table indicating relationships between the position addresses of the first magnetic heads and the position addresses of the second magnetic heads corresponding to the first magnetic heads; and obtaining the first addresses of the first magnetic heads with reference to the address lookup table, the first addresses corresponding to the second addresses that the second magnetic head reads out from the second magnetic disk, thereby to cause each of the first magnetic heads to write the magnetic data to be transferred to the positions designated by the first addresses.

3. A method for obtaining magnetic head positions in a magnetic data writing apparatus including a spindle motor having a shaft mounting thereon a plurality of first magnetic disks, to which magnetic data is to be transferred, and a second magnetic disk storing at least in one major surface thereof original disk data including the magnetic data to be transferred to the first magnetic disks and/or the magnetic data consulted in writing magnetic data to the first magnetic disks, the spindle motor rotating the first magnetic disks and the second magnetic disk as a unit; and a plurality of rotary positioners on the periphery of the first and second magnetic disks, each of the rotary positioners stacking rotatably first magnetic heads making access to the respective surfaces of the first magnetic disks and a second magnetic head for reading the original disk data from the second magnetic disk into a unit, the first magnetic heads on each surface of each of the first magnetic disks being assigned to the respective track ranges on the surface for writing magnetic data to the respective track ranges, the second magnetic heads being assigned to the respective track ranges on one surface of the second magnetic disk corresponding to the track ranges of the corresponding first magnetic heads, thereby to cause the first magnetic heads simultaneously to write the magnetic data determined based on the original disk data, which the second magnetic heads read out from the second magnetic disk, to the respective track ranges assigned thereto on the respective surfaces of the first magnetic disks, the method comprising:

mounting third magnetic disks on the shaft of the spindle motor in place of the first magnetic disks prior to writing magnetic data to the first magnetic disks, the third magnetic disks storing calibration data on the surfaces thereof for facilitating accurate reading by the first magnetic heads of first addresses indicating the addresses of the tracks and sectors at which the first magnetic heads are present; and reading out second addresses included in the original disk data, by the second magnetic heads from the second magnetic disk, the second addresses indicating the position addresses of the tracks and sectors on the second magnetic disk where the second magnetic heads are present, and reading out the first addresses from the third magnetic disks simultaneously with reading out the second addresses, thereby to obtain relationships between the position address of each second magnetic head and corresponding position addresses of the first magnetic heads.

4. The method according to claim 3, the method further comprising:

comparing the first address, which each of the first magnetic heads reads out while scanning the corresponding third disk surface including at least a track range assigned to the each of the first magnetic heads, and the second address corresponding to the first address, thereby to prepare an address lookup table indicating relationships between the position addresses of the first magnetic heads and the position addresses of the second magnetic heads corresponding to the first magnetic heads; and obtaining the first addresses of the first magnetic heads with reference to the address lookup table, the first addresses corresponding to the second addresses that the second magnetic head reads out from the second magnetic disk, thereby to cause each of the first magnetic heads to write the magnetic data to be transferred to the positions designated by the first addresses.

* * * * *